June 22, 1926.
J. H. MILLER
1,589,812
ALTERNATING CURRENT VOLT AMMETER
Filed Oct. 5, 1925
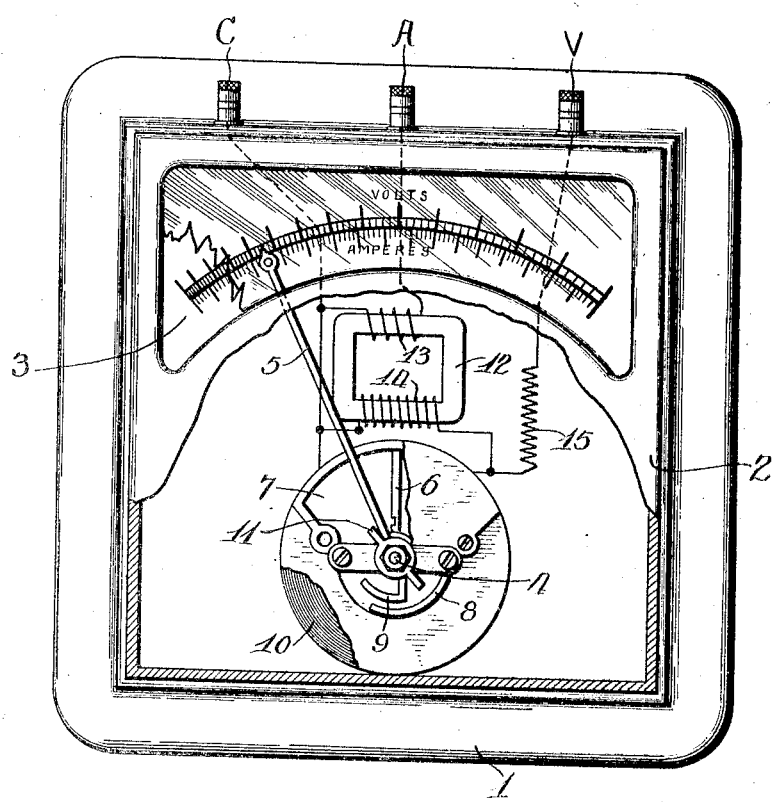
Inventor:
John H. Miller.
By Williams, Bradbury,
McCaleb & Hinkle Attys.

Patented June 22, 1926.

1,589,812

UNITED STATES PATENT OFFICE.

JOHN H. MILLER, OF OAK PARK, ILLINOIS, ASSIGNOR TO JEWELL ELECTRICAL INSTRUMENT COMPANY, OF CHICAGO, ILLINOIS, A CORPORATION OF ILLINOIS.

ALTERNATING-CURRENT VOLTAMMETER.

Application filed October 5, 1925. Serial No. 60,414.

My invention relates to instruments for measuring the voltage and amperage of alternating currents, and especially to an instrument which is readily adapted to measure either of these quantities.

The object of my invention is to provide an alternating current volt-ammeter in which the connections in the instrument itself need not be changed in order to convert it from a voltmeter to an ammeter, but such conversion can be accomplished by merely changing the external connections to the instrument.

A further object is to provide an alternating current volt-ammeter having only three terminals.

A further object is to provide an alternating current volt-ammeter which is simple in construction and accurate in operation, and which can be cheaply manufactured.

Other objects will appear from the following description, reference being made to the accompanying drawing, in which the figure shows the instrument diagrammatically with parts of the casing broken away in order to clearly show the working parts.

As an illustration of the utility of my invention, I may explain that in testing the current supplied to railway signal circuits it has been necessary, in the past, for the inspector to carry two instruments with him in order to test the alternating current voltage and amperage. By using the instrument of my invention it is necessary for him to carry only one instrument, with accompanying saving in labor and expense, and increasing the speed of testing. The instrument which I have invented is also very useful in electrical laboratories and, in fact, wherever occasion arises to determine alternating current voltage and amperage.

Due to the simple construction of the instrument of my invention, it can be manufactured at a cost considerably lower than the cost of the two instruments which it replaces.

I have shown and will describe my invention in connection with an instrument of the "iron vane" type, variously known also as the "moving iron" or "soft-iron" type. This is a well known type of instrument in which the indicator is deflected by the force of repulsion between two pieces of iron or steel, which are magnetized by the current which is being measured passing through a coil of wire surrounding the vanes.

The instrument as diagrammatically shown, is mounted on a base 1 upon which a suitable case 2 is secured. A suitably calibrated scale 3 is fixed to the top of the case in parallel spaced relation thereto so as to be visible through a glass covered aperture in the top of the case, as is usual in this class of instruments.

The moving element consists of a pivotally mounted shaft 4 at the upper end of which the pointer 5 is rigidly secured. Also rigid with this shaft is the fan 6 which swings with sufficiently small clearance in a closed damping chamber 7 as to absorb the rotative energy given to the shaft and render the resulting actions dead beat. The force tending to rotate the shaft 4 is the result of the magnetic repulsion between the vane 8, which is fixed relative to the base, and the vane 9, which is rigidly secured to the lower portion of the shaft 4. The vanes are surrounded by a coil 10 of insulated wire which is secured to the base and is electrically connected to the line in which the current is to be measured. A suitable adjustable stop 11 limits the motion of the pointer at its zero position. The usual spiral spring (not shown) is connected to the shaft and tends to rotate it toward the zero position in which the pointer engages the stop.

Thus far I have described only the parts of the meter which are well known in the art. My invention consists in the novel electrical connections by which I utilize the parts of an instrument as above described to give an indication of either current or voltage.

To accomplish this result I provide a transformer consisting of a core 12 upon which is a primary winding 13 of a relatively few number of turns of insulated low resistance wire. One end of the primary winding 13 is connected to the common terminal or binding post C, the other end being connected to the terminal A. The transformer secondary winding 14 has a relatively great number of turns of fine insulated wire and consequent relatively high reactance. The ends of the secondary winding 14 are connected to the ends of the coil 10, which should have a low reactance as compared with the reactance of the secondary winding 14. The third terminal V is connected through a resistance 15 to one end of the coil 10, the other end of which is connected to the terminal C.

To determine the current in a line, connections are made to the terminals C and A. The current will thus flow through the primary winding 13 and, through the resultant flux, cause a proportional current in the secondary winding 14 and the coil 10. The current in the coil 10 will effect the magnetization of the vanes 8 and 9 and cause the vane 9 to be repelled a distance which is a function of the current passing through the coil 10, and therefore by proper graduation and calibration of the scale 3, the indication is made to read in amperes flowing through winding 13.

To determine voltage, connections are made to the terminals C and V. Since these terminals are connected to the ends of the coil 10 the instrument will function as above described. The winding 14 has such a high reactance as compared with that of the coil 10, that the current passing through it will be negligible. The resistance 15 cuts down the current passing through the coil 10 to an amount comparable to that flowing through the coil when the instrument is being used as an ammeter, so that by suitable graduation and calibration of the scale 3, the indication will be in number of volts difference in potential between the terminals C and V.

It will thus be seen that the instrument functions equally well as an ammeter and as a voltmeter, without the necessity of making any changes in the internal connections of the parts of the instrument, but by merely changing the external connections to the instrument.

It will be understood that while I have described my invention in connection with the iron vane type of instrument, it may be readily adapted to other types of instruments. The invention is capable of wide variations and adaptation in other respects for use in different embodiments without departure from the principles of the invention. I do not restrict myself in any unessential particulars but—

What I claim and desire to secure by Letters Patent is:

1. In combination with an alternating current measuring instrument of the iron vane type having a coil for magnetizing the vanes, a transformer core, a primary winding thereon connected at its ends to a pair of terminals, a secondary winding connected in a closed circuit in series with said coil, the reactance of the secondary winding being very much higher than that of the coil, connections from one of said terminals to one end of said coil, and high resistance connections from a third terminal to the other end of said coil.

2. In combination, an alternating current measuring instrument having a pair of conductors for transmitting electrical energy for actuating said instrument, a transformer having primary and secondary windings, a pair of connectors connecting each end of said secondary winding with a respective conductor, a common terminal, a voltage terminal, an amperage terminal, a high resistance connection from said voltage terminal to one of said conductors, a connection from said common terminal to the other of said conductors, and means for connecting the ends of said primary winding to said common terminal and said amperage terminal respectively.

3. In combination with an instrument having a coil and means for indicating the current flowing through said coil, a transformer having a primary winding and a high reactance secondary winding, a terminal connected to one end of said primary winding, to one end of said secondary winding, and to one end of said coil, a second terminal connected to the other end of said primary winding, and a third terminal connected through a high resistance element to the other end of said secondary winding and to the other end of said coil, so that current may be measured by making connection to the first and second terminals and voltage may be measured by making connection to the first and third terminals.

4. An alternating current volt-ammeter comprising an indicator, a coil, means to actuate said indicator in accordance with the current flowing through said coil, a transformer having primary and secondary windings, said secondary winding being connected to said coil in a closed series circuit, a resistance means for connecting said secondary winding to an external circuit and means for connecting said coil and resistance in series to an external circuit.

In witness whereof, I hereunto subscribe my name this 2nd day of October, 1925.

JOHN H. MILLER.